Dec. 4, 1923.
H. L. BEARD ET AL
CHAIN FASTENER
Filed June 19, 1922
1,476,583
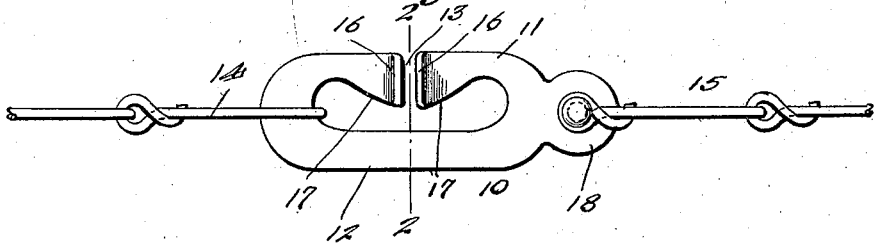
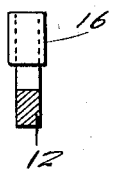
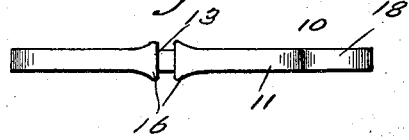
H. L. Beard
H. A. Strealy  INVENTOR
BY *Victor J. Evans*
ATTORNEY
WITNESSES Patented Dec. 4, 1923.

1,476,583

UNITED STATES PATENT OFFICE.

HARRY L. BEARD AND HARRY A. STREALY, OF LEWISBURG, WEST VIRGINIA.

CHAIN FASTENER.

Application filed June 19, 1922. Serial No. 569,238.

*To all whom it may concern:*

Be it known that we, HARRY L. BEARD and HARRY A. STREALY, citizens of the United States, residing at Lewisburg, in the county of Greenbrier and State of West Virginia, have invented new and useful Improvements in Chain Fasteners, of which the following is a specification.

This invention relates to hooks, and contemplates the provision of a hook which is primarily designed for use in connecting the adjacent ends of a chain or the like, and constructed to facilitate the association of the parts, and at the same time prevent casual separation of the ends of the chain from the hook under any and all conditions.

More specifically stated, the invention provides a hook of an elongated character, wherein one side of the hook is provided with an opening to receive the adjacent link of the chain, and which side of the hook provided with the opening is shaped to prevent casual separation of the link from the hook.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1 is a side elevation of the hook, showing the manner of connecting the adjacent ends of a chain together.

Figure 2 is a sectional view taken on line 2—2 of Figure 1.

Figure 3 is a top plan view of the device.

The hook forming the subject matter of the present invention is indicated generally at 10 and is of an elongated design, including the opposed sides 11 and 12 respectively. These sides are substantially of the same length, while the side 11 is provided with an opening or slot 13 at a point approximately midway between the ends thereof. This positions the slot so that the link 14 of the chain 15 cannot possibly find its way through the slot, after the parts have once been associated, as would otherwise be the case should the slot be located adjacent one end of the hook. The adjacent ends of the separated portions of the side 11, defined by the slot 13 are enlarged as at 16, and the underside of these terminals are bevelled as at 17, so that any movement of the link within the hook caused by slackening the chain, will direct said link away from the slot 13 to prevent casual separation of the parts. Projecting from one end of the hook is an apertured hook 18, with which one end of the chain is connected in a manner clearly illustrated. It is to be understood that the hook can be made of any suitable material, and vary in size without departing from the spirit of the invention.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

What we claim is:—

A chain fastener comprising U-shaped body, oppositely extending and opposed extensions carried thereby, the latter increasing in width toward their extremities and having their ends spaced and formed with wings which extend vertically and transversely from the ends, the ends extending beyond the plane of the side faces of the extensions.

In testimony whereof we affix our signatures.

HARRY L. BEARD.
HARRY A. STREALY.